(12) United States Patent
Tobinai et al.

(10) Patent No.: US 6,334,606 B1
(45) Date of Patent: Jan. 1, 2002

(54) CARBURETOR FOR STRATIFIED TYPE SCAVENGING ENGINE

(75) Inventors: Teruhiko Tobinai; Shin-Ichi Ohgane; Tamio Aihara, all of Miyagi (JP)

(73) Assignee: Walbro Japan, Inc., Tokyo (JP)

( * ) Notice: Subject to any disclaimer, the term of this patent is extended or adjusted under 35 U.S.C. 154(b) by 0 days.

(21) Appl. No.: 09/493,362

(22) Filed: Jan. 28, 2000

(30) Foreign Application Priority Data

Feb. 1, 1999 (JP) .......................................... 11-024209

(51) Int. Cl.$^7$ .............................................. F02M 23/09
(52) U.S. Cl. .......................... 261/23.3; 261/46; 261/47; 261/DIG. 1
(58) Field of Search ........................... 261/23.3, 46, 47, 261/23.2, DIG. 1

(56) References Cited

U.S. PATENT DOCUMENTS

| | | | |
|---|---|---|---|
| 2,169,622 A | * 8/1939 | Weiertz et al. | 261/DIG. 1 |
| 3,830,206 A | * 8/1974 | Asaka et al. | 261/23.3 X |
| 4,038,957 A | * 8/1977 | Hosho et al. | 261/23.3 X |
| 4,083,341 A | 4/1978 | Brettsschneider et al. | 123/124 |
| 4,086,885 A | * 5/1978 | Noguchi et al. | 261/23.3 X |
| 4,163,434 A | 8/1979 | Tsukamoto et al. | 123/119 |
| 4,232,640 A | * 11/1980 | Matsumoto et al. | 261/23.3 X |
| 4,325,349 A | 4/1982 | Fehrenbach | 123/587 |

FOREIGN PATENT DOCUMENTS

DE 2431046 1/1975

\* cited by examiner

*Primary Examiner*—Richard L. Chiesa
(74) *Attorney, Agent, or Firm*—Reising, Ethington, Barnes, Kisselle, Learman & McCulloch,P.C.

(57) ABSTRACT

A carburetor for a stratified type scavenging engine has a scavenging air supply passage with an air valve therein, a fuel and air mixture passage having a throttle valve therein, a diaphragm which defines a negative pressure chamber on one side and an atmospheric chamber on its other side, and a low pressure passage that communicates a venturi portion of the fuel and air mixing passage with the negative pressure chamber. The air valve is responsive to movement of the diaphragm caused by the pressure differential across it to move the air valve between open and closed positions and a spring yieldably biases the air valve towards its closed position. The air valve is not directly mechanically connected or linked to the throttle valve. Thus, when the throttle valve is rapidly opened during engine acceleration, the air valve is not immediately rapidly opened and is not significantly opened until a sufficient pressure differential exists across the diaphragm. Therefore, during initial rapid acceleration of the engine from idle, the air valve prevents a significant flow of scavenging air to the engine to ensure a sufficiently rich fuel and air mixture is supplied to the engine to support the rapid acceleration.

9 Claims, 1 Drawing Sheet

CARBURETOR FOR STRATIFIED TYPE SCAVENGING ENGINE

REFERENCE TO RELATED APPLICATION

Applicants claim priority of Japanese application, Ser. No. JP 11-024209, filed Feb. 1, 1999.

FIELD OF THE INVENTION

This invention relates to a carburetor for a two stroke engine and more particularly to a carburetor which provides to the engine a scavenging air supply in addition to a fuel and air mixture supplied to the engine.

BACKGROUND OF THE INVENTION

It has been proposed in two stroke engines to provide a scavenging air supply to facilitate removal of exhaust gases from the engine cylinder and to provide a buffer between the incoming fresh fuel and air mixture and the outgoing exhaust gases to inhibit the escape through the exhaust port of the fresh fuel and air mixture before its combustion. While effective for its intended purpose, the introduction of scavenging air, in addition to the air within the fresh fuel and air mixture delivered to the engine, provides a resulting fuel and air mixture which is too lean to support abrupt or rapid acceleration of the engine which requires a somewhat rich fuel and air mixture. Sometimes, when rapidly accelerated, the engine may stall and cease to operate because the scavenging air makes the fuel and air mixture too lean for such acceleration.

In prior carburetors having a fuel and air mixing passage and a scavenging air passage, an air valve in the scavenging passage has been mechanically linked in some manner to a throttle valve in the fuel and air mixing passage. In these carburetors, the extent to which the air valve is opened depends on the extent to which the throttle valve is opened. Therefore, when the throttle valve is rapidly opened, such as to provide an abrupt acceleration of the engine, the air valve also opens providing additional scavenging air into the engine which can lead to a fuel and air mixture which is too lean to support the abrupt acceleration of the engine. Therefore, a need exists to control the air valve independently of the throttle valve at least during rapid acceleration of the engine so that a relatively rich fuel and air mixture may be supplied to accelerate the engine.

SUMMARY OF THE INVENTION

A carburetor for a stratified type scavenging engine has a scavenging air supply passage with an air valve therein, a fuel and air mixing passage having a throttle valve therein, a diaphragm which defines a negative pressure chamber on one side and an atmospheric chamber on its other side, and a low pressure passage that communicates a venturi portion of the fuel and air mixing passage with the negative pressure chamber. The air valve is responsive to movement of the diaphragm caused by the pressure differential across it to move the air valve between open and closed positions and a spring yieldably biases the air valve towards its closed position. The air valve is not directly mechanically connected or linked to the throttle valve. Thus, when the throttle valve is rapidly opened during engine acceleration, the air valve is not immediately rapidly opened and is not significantly opened until a sufficient pressure differential exists across the diaphragm. Therefore, during initial rapid acceleration of the engine from idle, the air valve prevents a significant flow of scavenging air to the engine to ensure a sufficiently rich fuel and air mixture is supplied to the engine to support the rapid acceleration.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENT

Figure 1:
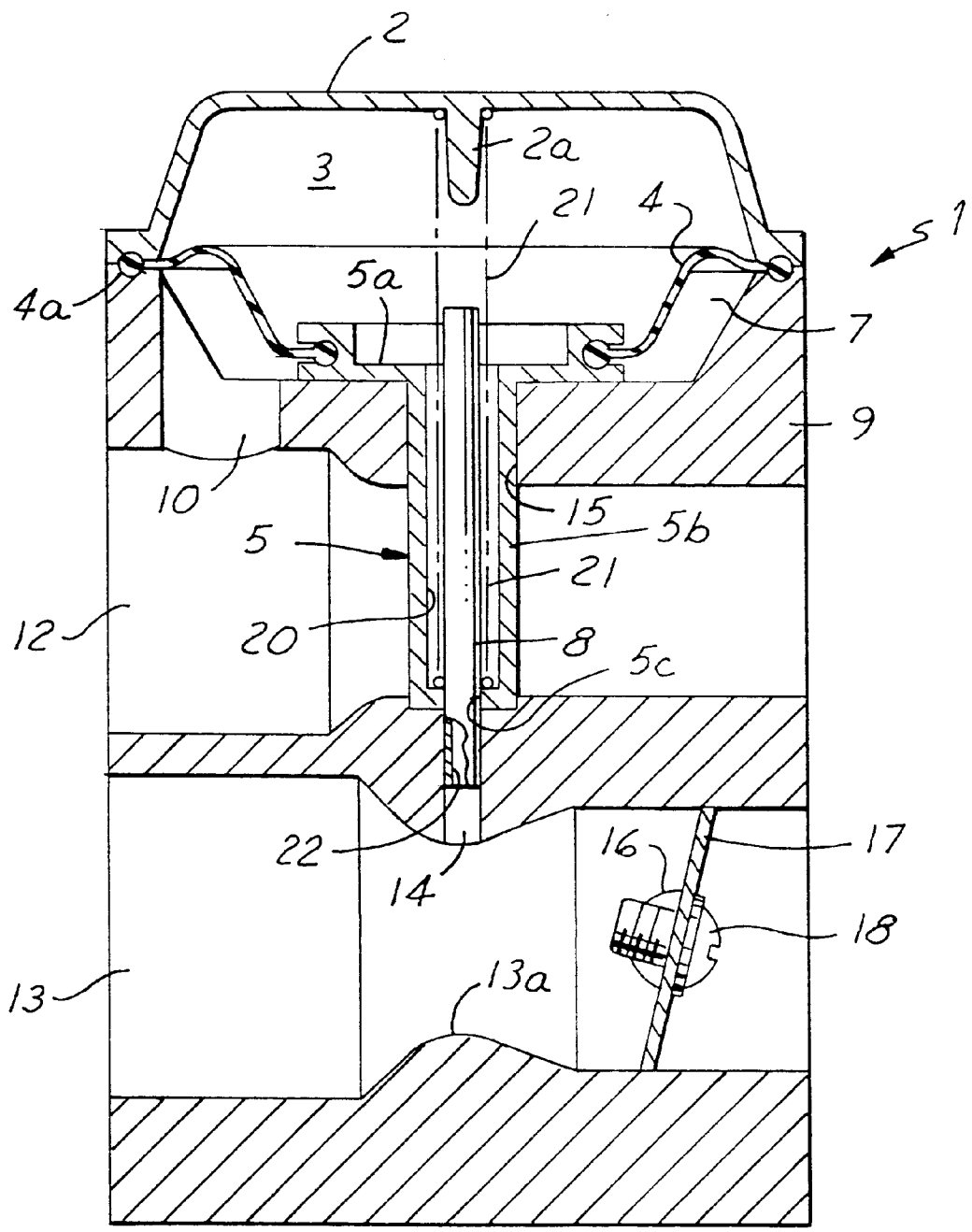
FIG. 1 is a sectional side view of a carburetor for a stratified type scavenging engine according to the invention.

As shown in FIG. 1, a carburetor 1 for a stratified type scavenging engine has a scavenging air passage 12 laterally extending in an upper part of the carburetor body 9, a fuel and air mixing passage 13 in a lower part thereof, and a cover plate 2 attached to an upper end portion of the carburetor body 9. The fuel and air mixing passage 13 has a venturi portion 13a to create a passage drop when fluid flows through it. A flexible membrane or diaphragm 4 has its peripheral edge 4a clamped between the carburetor body 9 and the cover plate 2 to define a negative or low pressure chamber 3 between the cover plate 2 and the diaphragm 4 and an atmospheric chamber 7 between the diaphragm 4 and the body 9. The atmospheric chamber 7 is communicated with the scavenging passage 12 through a bore 10 in the body 9 and also through an opening 15 through which an air valve 5 extends.

The air valve 5 is rectangular in shape in cross section and has a flange 5a connected to the diaphragm 4 for movement with the diaphragm 4. The air valve 5 also has a main body 5b integral with the flange 5a and defining a cavity 20 open at one end to the negative low pressure chamber 3 and open at its other end through a bore 5c in the body 5b. To yieldably bias the air valve 5 to its closed position an upper end of a spring 21 is retained by a projection 2a of the cover plate 2, while a lower end of the spring 21 bears on a lower end of the air valve 5 within the cavity 20. The air valve 5 is adapted to move from its closed position shown in FIG. 1 substantially preventing air flow through the scavenging passage, toward its open position permitting air flow through the scavenging passage 12, according to the magnitude or intensity of a pressure drop across the diaphragm 4 caused by a negative or subatmospheric pressure in the negative pressure chamber 3. For this purpose, the air valve 5 is slidably supported in the opening 15 which is rectangular in shape in cross section and opens into the atmospheric chamber 7 from the scavenging passage 12 in the carburetor body 9.

In order to introduce a negative or subatmospheric pressure from the fuel and air mixing passage 13 into the negative pressure chamber 3, a through hole 14 opens to the venturi portion 13a of the fuel and air mixing passage 13 and a tubular pipe 8 defining a low pressure passage 22 extends into the hole 14 at one end, through the bore 5c and at least partially into the cavity 20 of the air valve 5. Thus, when a pressure drop exists across the pipe 8 and diaphragm 4, the low pressure chamber 3 is evacuated through the pipe 8 and the diaphragm 4 is displaced toward the cover plate 2 to open the valve 5.

A throttle valve 17 is connected by means of a bolt 18 to a valve shaft 16 which transverses the fuel and air mixing passage 13. Though not shown in the drawing, the fuel and air mixing passage 13 is provided with a high speed fuel nozzle at the venturi portion 13a and a low speed fuel induction or injection hole or port near a closed or idle position of the throttle valve 17.

In operation of the carburetor on a stratified type scavenging engine, when the engine is operating with the throttle valve 17 in its idle position, air is drawn through the fuel and air mixing passage 13 from an air filter (not shown) to the right of the body 9 (as viewed in FIG. 1) and is supplied to the engine mixed with the fuel from the low speed fuel injection hole. The pressure drop at the venturi portion 13a in the fuel and air mixing passage 13 and across the pipe 8 is relatively low, and the air valve 5 is biased toward its closed position by the force of the spring 21 to at least substantially close the scavenging passage 12. When the engine is rapidly accelerated from idle or low speed engine operation the throttle valve 17 is rapidly opened towards its wide open position to increase the air flow through the fuel and air mixing passage 13 and the amount of fuel delivered from the carburetor. The increased air flow in the fuel and air mixing passage 13 generates an increased pressure drop at the venturi 13a which is communicated to the negative pressure chamber 3 by the pipe 8. This creates a differential pressure across the diaphragm 4 and thereby draws the diaphragm 4 towards the cover plate 2 and displaces the air valve 5 against the bias of the spring 21. With the air valve 5 opened, air flows through the scavenging air passage 12, past the air valve 5 and to the engine.

At high speed operation of the engine, the air from the scavenging air passage 12 flows through a valve (preferably a check valve) into a combustion chamber of an engine cylinder, just before a piston of the engine finishes a combustion-exhaust stroke. During this stroke, the piston moves from a top dead center position to a bottom dead center position, and combustion exhaust gases are exhausted through an exhaust port of the cylinder. At the same time, a rich fuel and air mixture in a crankcase of the engine is compressed by the downward stroke of the piston. Then, during the piston's upward or suction-compression stroke from bottom dead center to top dead center, the rich fuel and air mixture in the crankcase is supplied to the combustion chamber and is compressed in the combustion chamber by the upward stroke of the piston. The upward piston stroke also draws a fresh fuel and air mixture from the carburetor fuel and air mixing passage into the crankcase of the engine for use in the next engine cycle.

According to the invention, the air valve 5 in the scavenging passage 12 is opened by a pressure drop at the venturi portion 13a of the fuel and air mixing passage 13 which is communicated with the negative or low pressure chamber 3. Accordingly, when the throttle valve 17 is suddenly, rapidly opened, such as during abrupt or rapid acceleration of the engine from idle, the magnitude of the pressure drop in the fuel and air mixing passage 13 increases relatively gradually compared to the movement of the throttle valve 17 so the air valve 5 will not open too abruptly but rather, opens later and more slowly than the throttle valve 17. Thus, at the time of sudden acceleration of the engine, the scavenging air supply is at least substantially prevented from being delivered to the engine cylinder combustion chamber and substantially only the rich fuel and air mixture is supplied to the engine. This avoids an overly lean fuel supply in the engine and ensures that adequate fuel is supplied to the engine to support its acceleration.

Desirably, the timing of the opening of the air valve 5 with respect to the throttle valve 17 can be preset by changing the force characteristics of the spring 21. The opening of the air valve 5 can also be varied by controlling the rate at which the negative pressure chamber 3 is evacuated to displace the diaphragm 4 and hence, the air valve 5. This can be controlled by changing the inner diameter of the pipe 8 or by providing a nozzle or jet having a desired orifice size fitted to the pipe 8.

As described above, according to the invention, a carburetor for a stratified type scavenging engine is provided which comprises a scavenging passage having an air valve, a fuel and air mixing passage having a throttle valve, a diaphragm defining in part a negative pressure chamber and an atmospheric chamber, a negative pressure introducing pipe communicating the venturi portion of the fuel and air mixing passage with the negative pressure chamber, and a spring yieldably biasing the air valve to its closed position to at least substantially prevent air flow through the scavenging air passage. So constructed, the opening of the air valve 5 is slower or slightly delayed in comparison to the opening of throttle valve 17 at least during rapid engine acceleration, and can be readily adjusted to control the supply of scavenging air to the engine during rapid acceleration of the engine to avoid an overly lean fuel and air mixture in the engine insufficient to support engine acceleration.

What is claimed is:

1. A carburetor for a two-stroke engine having separate scavenging air and fuel and air mixture intake passages, the carburetor comprising:

a body, a scavenging air passage through the body, an air valve in the scavenging air passage configured to control the flow of air through the passage to the engine scavenging air intake passage;

a fuel and air mixing passage through the body for supplying a mixture of fuel and air to the engine fuel and air intake passage, a venturi in the mixing passage, and a throttle valve in the mixing passage to control the flow of a mixture of fuel and air through the passage to the engine; and a diaphragm carried by the body, defining in part a closed low pressure chamber and connected to the air valve to open and close the air valve in response to movement of the diaphragm, and a passage continuously communicating the venturi with the low pressure chamber and configured so that when the engine is operating and the throttle is initially rapidly opened, the opening of the air valve is delayed to ensure a sufficiently rich fuel and air mixture is supplied to the engine to support acceleration.

2. The carburetor of claim 1 wherein the low pressure passage is formed in a pipe extending between the low pressure chamber and the venturi portion of the fuel and air mixing passage.

3. The carburetor of claim 1 which also comprises a biasing member yieldably biasing the air valve toward its closed position.

4. The carburetor of claim 3 wherein the biasing member is a spring having opposed ends and bearing at one end on the air valve.

5. The carburetor of claim 4 which also comprises a cover plate carried by the body and having a projection which retains the other end of the spring.

6. The carburetor of claim 1 wherein the diaphragm also defines in part an atmospheric chamber which is communicated with the scavenging air passage.

7. The carburetor of claim 1 wherein the low pressure passage is constructed to restrict air flow therethrough to control the rate at which the low pressure chamber is evacuated when low pressure source is applied to the low pressure chamber through the low pressure passage.

8. A carburetor, comprising:

a body having a scavenging air passage and a fuel and air mixing passage formed therein;

a diaphragm carried by the body and defining in part a low pressure chamber in communication with a source of subatmospheric pressure, with the diaphragm being movable in response to a pressure differential across the diaphragm;

an air valve carried by the diaphragm for movement therewith between a closed position and an open position to control air flow through the scavenging air passage whereby movement of the air valve between its open and closed positions is controlled by the application of subatmospheric pressure to the low pressure chamber;

a venturi portion formed in the fuel and air mixing passage and a low pressure passage in a pipe communicating the venturi portion with the low pressure chamber such that fluid flow through the venturi portion provides the source of subatmospheric pressure communicated with the low pressure chamber, and the pipe extends through at least a portion of the air valve.

9. The carburetor of claim 8 which also comprises a cover plate carried by the body clamping a periphery of the diaphragm with the body and defining in part the low pressure chamber.

* * * * *